United States Patent [19]
Král et al.

[11] 3,874,245
[45] Apr. 1, 1974

[54] DRIVE APPARATUS FOR ROTARY SPINDLES

[75] Inventors: Jan Král; Kurt Kerlin; Heldemar Gratza, all of Dolni Benesov; Alfons Harazim, Stepankovice, all of Czechoslovakia

[73] Assignee: Moravskoslezska armaturka, narodni podnik, Dolni Benesov, Czechoslovakia

[22] Filed: Feb. 5, 1974

[21] Appl. No.: 439,704

[30] Foreign Application Priority Data
Feb. 12, 1973 Czechoslovakia .................. 995-73

[52] U.S. Cl. ........................... 74/89.15, 74/424.8 R
[51] Int. Cl. ............................................. F16h 27/02
[58] Field of Search ..................... 74/89.15, 424.8

[56] References Cited
UNITED STATES PATENTS
| | | | |
|---|---|---|---|
| 2,874,935 | 2/1959 | Caster | 74/424.8 R |
| 3,043,160 | 9/1962 | Killian | 74/89.15 |
| 3,103,909 | 9/1963 | Anderson | 74/424.8 R |
| 3,220,718 | 11/1965 | Wikkerink | 74/424.8 R |
| 3,385,120 | 5/1968 | Nott | 74/89.15 |

FOREIGN PATENTS OR APPLICATIONS
212,164 11/1960 Germany ........................ 74/89.15

Primary Examiner—Wesley S. Ratliff, Jr.
Attorney, Agent, or Firm—Murray Schaffer

[57] ABSTRACT

Drive apparatus for a rotary spindle valve having an elongated screw and a feed nut located on the screw connected by lever means to the rotary spindle. The feed nut is slidably maintained between a pair of rails having planar surfaces engaging opposite faces of the feed nut. One of the rails is adjustably mounted to enable the planar surfaces to be maintained parallel to each other. Low friction slide plates are removably provided on the feed nut.

9 Claims, 2 Drawing Figures

DRIVE APPARATUS FOR ROTARY SPINDLES

BACKGROUND OF INVENTION

The present invention relates to apparatus for controlling rotary valve spindles.

It is known to automatically and/or manually operate the spindles of rotary valves with a drive apparatus employing an elongated power screw on which a feed nut is located connected by a swing lever mechanism to the spindle of the valve. In such drives the connecting lever mechanism generally swings reciprocably within a selected arc of between 0° to 90° in order to open and close the valve. As a result radial forces and undesirable torque occur, acting adversely on the feed nut and even on the power screw. Consequently, the power screw is subject to a bending load tending to distort it and cause binding of the feed nut. In order to obtain reliable and efficient functioning of the drive over extended periods of time, the radial forces must be transmitted to the housing or casing in which the screw and feed nut are mounted, rather than to the screw itself.

It has been attempted to transfer such radial forces to the housing by providing the feed nut with extending pins on the ends of which rollers are mounted. The rollers are adapted to engage defined guide surfaces formed on the inner faces of the casing and its cover. The guide surfaces create parallel planes between which the feed nut may move. A disadvantage of this design lies in the fact that the formation of the guide surfaces require exact parallelity and flatness so as to define the functional planes. This operation is laborious and time-consuming. Furthermore, it is general to provide the guide surfaces in two sections, each defining opposite parallel planes, about the feed nut. Thus four planes must be created. Because of such a large number, substantial misalignment frequently occurs and it is difficult to provide those requirements necessary for the proper operation of the feed nut.

It is an object of the present invention to provide drive apparatus for a rotary valve spindle overcoming the disadvantages of the known prior art.

It is a further object of the present invention to provide drive apparatus for rotary valve spindle having a power screw and a feed nut located thereon wherein the feed nut is guided only between a pair of guiding planes without the need for a roller mechanism.

It is an object of the present invention to provide a power drive of the type described wherein the guiding planes are adjustable so as to maintain their parallel relationship reliably securing the transfer of radial forces onto the surrounding housing.

It is a further object of the present invention to provide drive apparatus of the type described having a feed nut improved with low friction slidable surfaces which may be removed after wear and replaced with new slidable surfaces.

It is a further object of the present invention to provide a drive apparatus of simple design which is economical in both manufacture and use.

The foregoing objects, together with numerous other objects, will be apparent from the following disclosure of the preferred embodiment of the present invention.

SUMMARY OF THE INVENTION

According to the present invention drive apparatus for controlling the operation of a rotary valve spindle is provided comprising a body in which an elongated screw is rotatably mounted. A feed nut is located on the screw and lever means are provided adapted to connect the feed nut and the spindle of the rotary valve so as to transfer the axial movement of the feed nut along the screw into rotary movement of the spindle. Means are provided for guiding the feed nut on said screw in an axial direction comprising first and second rail means, each having a planar surface engaging opposite faces of the feed nut. One of the rails is secured to an inner surface of the body while the other rail means is mounted so as to be adjustable with respect to the first rail means so that the planar surfaces can be made and maintained parallel to each other.

As a result of the present invention the feed nut is maintained between two planar surfaces which prevent its radial movement about the power screw and which transfers any radial forces or torque directly to the surrounding housing rather than to the screw. Because of the adjustability of one of the rail members the parallel relationship between the planar surfaces can be maintained during the operation of the apparatus and not just provided initially during manufacture.

Preferably the adjustable rail is mounted on a pair of lugs integrally formed with the housing through which adjustment screws extend.

In another aspect of the present invention the surfaces of the feed nut adapted to engage with the planar surfaces of the guide rails is provided with low friction slide plates which allow the feed nut to readily slide with respect to the rails. Preferably, the slide plates are removably maintained on the feed nut so that they may be replaced when worn.

In still another aspect of the present invention, the lever mechanism connecting the feed nut with the valve spindle comprises a control lever which is connected to the feed nut by means of a pair of pull-rods which are spaced from each other an amount exceeding the width of the feed nut, so as to straddle the feed nut and the power screw. This provides a balanced mechanism on either side of the feed nut further reducing the possibility of the creation of undesirable radial forces.

Full details of the present invention are given in the following description and is shown in the accompanying drawings.

DESCRIPTION OF THE INVENTION

Figure 1:
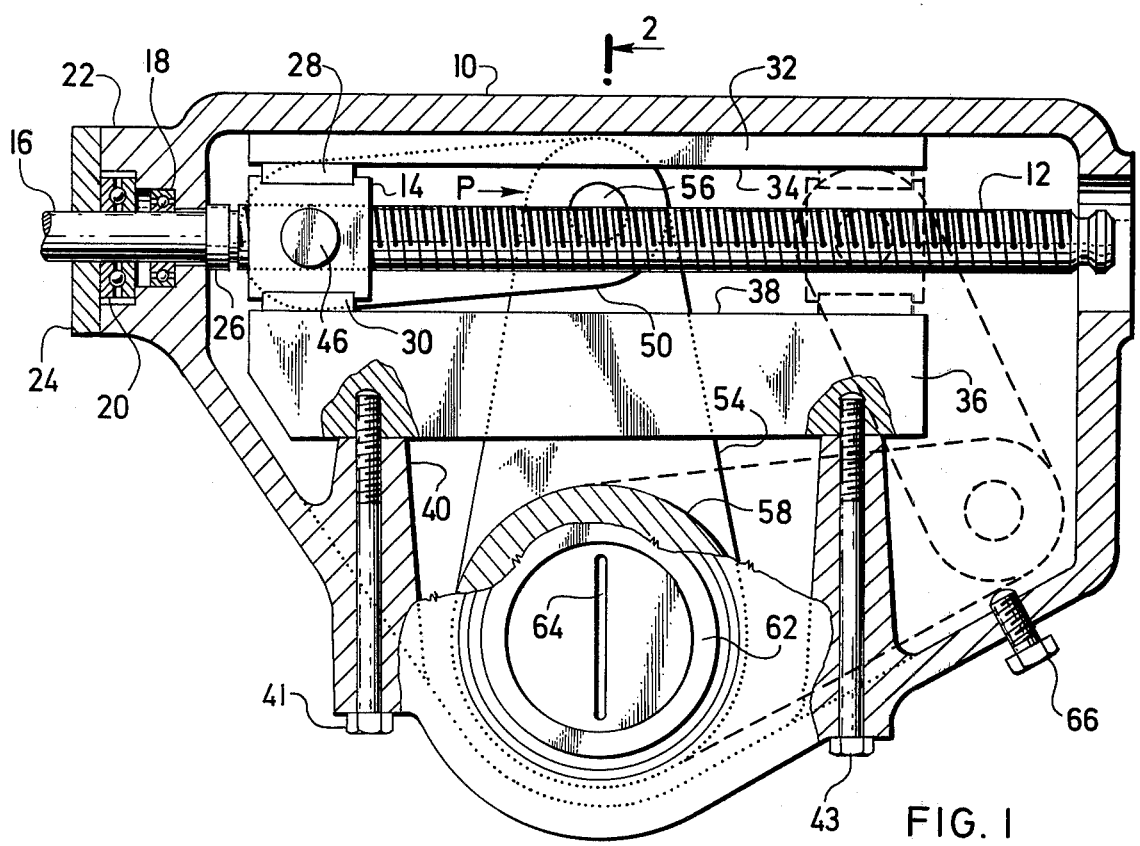
FIG. 1 is a side view of the present apparatus showing the housing partially in section and the location of the power screw and guide means therein.

As seen in FIG. 1 the drive apparatus of the present invention comprises a hollow box like casing or body 10, of generally triangular shape, forming a housing for an elongated power screw 12 extending along its upper edge. The power screw 12 is threaded along its length and is provided with a conformingly threaded feed nut 14. Extending integrally from one of the power screw 12 is a shaft 16, journaled in both a radial bearing 18 and an axial bearing 20, set within an enlarged boss 22 in the input end of the body 10. The bearings 18 and 20 are held by a cap 24 suitably fastened over the end of the boss 22 so that the power screw 12 extends cantilevered within the body 10. The power screw 12 and the shaft 16 may be formed of separable members, screwed or otherwise fastened together to provide a continuous rotatable rod. An enlarged flange 26 is provided at the input end of the power screw 12 to prevent the axial withdrawal of the feed nut 14.

Figure 2:
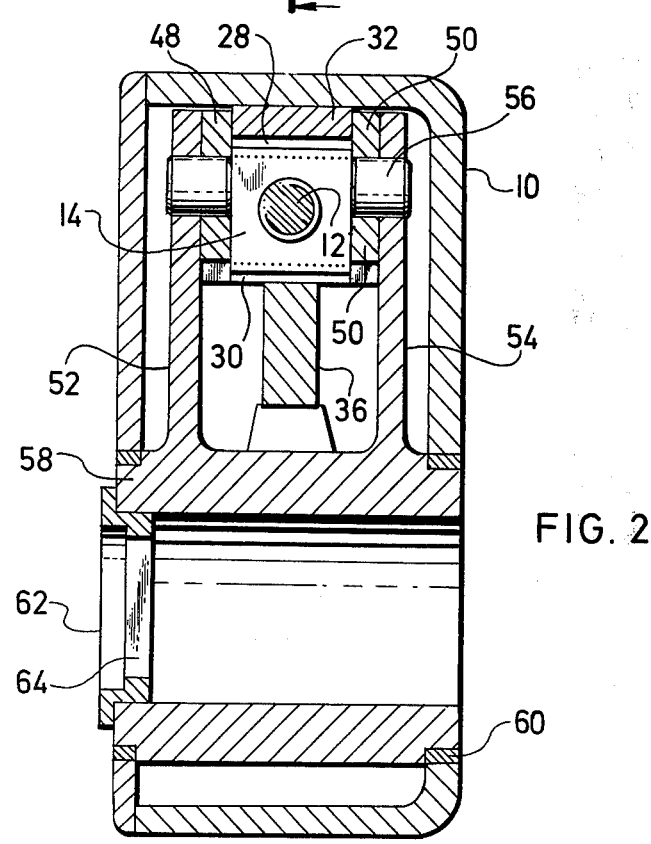
FIG. 2 is a sectional view of the apparatus shown in FIG. 1 taken along line 2—2.

The feed nut 14 has a generally rectangular outer configuration. A shallow slot is formed on its upper and lower surfaces, in each of which removable plates 28 and 30 are respectively set. The plates 28 and 30 are made of low friction material such as brass or a plastic, such as teflon so as to provide a very smooth and easily slidable surface. The upper sliding plate 28 abuts against an elongated rail 32 secured to (or integrally cast with) the undersurface of the upper end of the body 10. The engaging surface 34 of the rail 32 is formed to be smooth and flat so as to provide a first guide plane for the feed nut 14. The rail 32 is uniform along its length and has a width as seen in FIG. 2 approximately equal to the corresponding dimension of the feed nut. The slot in which the slide plate 28 is retained extends transverse to the rail 32 and opens to each side of the feed nut.

The lower slide plate 30 abuts against a rectangular, or prismatic rail 36 which has a flat upper surface adapted to lie in a plane 38 parallel to the plane 34 of the upper rail 32, thus forming a second guide plane for the feed nut 14. The lower rail 36 is supported on a pair of spaced lugs 40 and 42, forming pedestals for the rail at each of its ends. The lugs 40 and 42 are formed as a part of the interior of the body 10 and extend in a generally perpendicular direction to the upper edge of the body. Extending through each of the lugs 40 and 42 is an adjustable leveling screw 41 and 43 respectively. The leveling screws are adapted to be cooperatively adjusted so that the distance between the planes 34 and 38 may be equalized along their entire length thereby creating absolute parallel planar guide surfaces along which the feed nut 14 may slidably traverse. Both the lower beam 36 and its supporting lugs 40 and 42 are substantially narrower than the width of the feed nut, as seen in FIG. 2, although of sufficient width to provide a planar engaging surface for the slide plate 30.

Extending from the lateral sides of the feed nut 14, in the general plane of the power screw 12, are a pair of pivot pins 44 and 46 to which one end of a pair of pull-rods 48 and 50 are freely journaled. As seen in FIG 2, the pull-rods straddle the feed nut 14, the power screw 12 and both the upper and lower rails 32 and 36. The pull-rods are removably maintained upon the pins 44 and 46, by any suitable means, at a distance from each other slightly exceeding that of the width of the feed nut. This permits free movement between the pull-rods and the feed nut. It also permits the pull-rods to maintain the slide plates 28 and 30 in the slots formed on the opposing surfaces of the feed nut, which slots extend between the pull-rods.

The opposite ends of each of the pull-rods 48 and 50 are connected to a control lever which is adapted to swing in an arc carrying with it the rotary valve spindle. The control lever comprises a pair of actuating arms 52 and 54 connected at their upper ends by a pivot pin 56 to each of the pull-rods 48 and 50. The arms 54 and 56 are spaced from each other a distance sufficient to straddle the power screw 12. The lower end of the arms 52 and 54 are integrally formed or fixedly connected to a cylindrical hub 58 extending transversely to the axis of the power screw 12 and which is freely journaled between the side walls of the body 10. The ends of the hub 58 is necked down and is provided with suitable low friction seals 60 facilitating the journaling of the hub in the body 10. The hub 58 is adapted to receive and be secured to a spindle (not shown) extending from the rotary valve (also not shown) which is to be controlled and operated by the drive apparatus. The end of the hub is provided with a cap 62 on which a slot 64 or other marking may be engraved or otherwise provided to indicate the angular rotative position of the hub and consequently that of the valve spindle.

As will be apparent, rotation of the power screw 12 either by automatic and manual means connected to the input shaft 16, will cause the feed nut 14 to move along its length in the direction of the arrow P from a position adjacent the flange 26 toward the right to a position shown in the dotted lines of FIG. 1. This movement of the feed nut carries with it the pull-rods 48 and 50 causing the control arms 52 and 56 to swing in an arc of approximately 90°; that is from the vertical position to the substantially horizontal position seen in FIG. 1. The extreme right position of the arms 52 and 54 is limited by an adjustable screw stop 66 which extends through the housing into engagement with one or both of the arms 52 and 54. The extreme left position of the feed nut may conveniently represent the closed position of the rotary valve to be operated while the extreme right position may represent the open condition of the valve.

From the foregoing, it will be seen that the feed nut 14 is located between two parallel guiding planes, one of which is adjustably mounted so that the parallelity of the planes may be initially established and maintained over the period of use of the device. The guide planes are of substantial width, engaging the opposite surfaces of the feed nut so that the feed nut is stable between these two planar surfaces. Thus any radial force acting on the feed nut by movement of the pull-rods 48 and 50 and the control arms 52 and 54 are transferred directly to the housing body by either the fixed rail 32 or the adjustable rail 36. Consequently the power screw 12 will not be caused to bend or to bind with the feed nut 14. A further advantage is seen from the use of separable and easily removable slide plates which allow the use of low friction material which may be simply replaced after use. Still another advantage is obtained by employing a lever connecting mechanism having forked members, that is the parallel spaced pull-rods 48 and 50 as well as the parallel spaced arms 52 and 54, providing balanced parallel forces acting on the feed nut 14.

In addition to the various changes and modifications described above, those skilled in the present art will be aware of others. It is therefore intended that the present disclosure be taken as illustrative only of the present invention and not as limiting of its scope.

What is claimed is:

1. Drive apparatus for operating rotary valve spindles comprising a body, an elongated screw rotatably mounted in said body, a feed nut located on said screw, means for guiding said feed nut for movement on said screw in an axial direction and lever means adapted to connect said feed nut and the spindle of the rotary valve so as to convert said axial movement of said feed nut into rotary movement of said valve, comprising first and second rail means each having a planar surface adapted to engage opposite faces of the feed nut, and means for adjustably mounting at least one of said rail means to maintain the planar surfaces parallel to each other whereby said feed nut may slide in an axial direction and be prevented from rotating about said screw.

2. The apparatus according to claim 1 where at least one of said rail means has a width substantially equal to said feed nut.

3. The apparatus according to claim 1 where said adjustable rail means comprises a rectangular beam mounted upon a pair of lugs formed with said body and supported by adjustable screw means extending through said lugs.

4. The apparatus according to claim 1 including low friction slide plates removably secured to the faces of said feed nut engaging said rail means.

5. The apparatus according to claim 1 wherein said lever means comprises a control arm adapted to be connected to said valve spindle and a first pair of pull-rods connected at one end to said control arm and at its other end to said feed nut, the width between said pull-rods exceeding the width of said feed nut.

6. The apparatus according to claim 5 wherein the slide plates are located within a slot formed in the surface of said feed nut, said slot extending between the ends of said pull-rods whereby said plates may be retained therein.

7. The apparatus according to claim 5 wherein the control arm comprises a pair of arms straddling at one end said power screw and being attached at their opposite ends to a cylindrical hub adapted to receive the valve spindle.

8. The apparatus according to claim 5 including adjustable stop means mounted within said body engaging said connecting arm to selectively limit the extent of movement thereof.

9. The apparatus according to claim 1 wherein said power screw is journaled at one end in a bearing and extends cantilevered therefrom in an axial direction within said body between the planar surfaces of said guide rails.

* * * * *